United States Patent [19]

Paul

[11] 4,293,528

[45] Oct. 6, 1981

[54] YELLOWCAKE PROCESSING IN URANIUM RECOVERY

[75] Inventor: James M. Paul, DeSoto, Tex.

[73] Assignee: Mobil Oil Corporation, New York, N.Y.

[21] Appl. No.: 95,709

[22] Filed: Nov. 19, 1979

[51] Int. Cl.³ ............................................. C01G 43/01
[52] U.S. Cl. .......................................... 423/7; 423/3; 423/19; 423/260; 423/261
[58] Field of Search ................. 423/260, 261, 3, 19, 423/7

[56] References Cited

U.S. PATENT DOCUMENTS 2,811,412  10/1957  Poirier ..................................... 423/7
4,092,399  5/1978  Narayan et al. ........................ 423/7

OTHER PUBLICATIONS

Merritt, R. C., "The Extractive Metallurgy of Uranium" Colo. School of Mines Research Inst. 1971, pp. 247-254.
Harrington, C. D., *Uranium Production Technology*, D. Van Nostrand Company, Inc. Princeton, N. J. 1959, p. 162.

*Primary Examiner*—Deborah L. Kyle
*Attorney, Agent, or Firm*—Charles A. Huggett; James F. Powers, Jr.

[57] ABSTRACT

This information relates to the recovery of uranium from uranium peroxide yellowcake produced by precipitation with hydrogen peroxide. The yellowcake is calcined at an elevated temperature to effect decomposition of the yellowcake to uranium oxide with the attendant evolution of free oxygen. The calcination step is carried out in the presence of a reducing agent which reacts with the free oxygen, thus retarding the evolution of chlorine gas from sodium chloride in the yellowcake. Suitable reducing agents include ammonia producing compounds such as ammonium carbonate and ammonium bicarbonate. Ammonium carbonate and/or ammonium bicarbonate may be provided in the eluant used to desorb the uranium from an ion exchange column.

8 Claims, No Drawings

YELLOWCAKE PROCESSING IN URANIUM RECOVERY

BACKGROUND OF THE INVENTION

This invention relates to the recovery of uranium and, more particularly, to a procedure for the calcination of uranium yellowcake produced by precipitation with hydrogen peroxide.

Uranium is produced from uranium bearing ores by various leaching procedures which involve the use of a lixiviant, e.g., an aqueous carbonate-bicarbonate solution or acid solution, to leach the uranium from its accompanying gangue material. The leaching operation may be carried out in conjunction with surface milling operations in which the uranium ore is mined and then crushed and blended prior to leaching, heap leaching of ore piles at the surface of the earth, or in situ leaching in which the lixiviant is introduced into the subterranean ore deposit and recovered therefrom through suitable injection and production systems. Typically, the lixiviant contains a suitable oxidizing agent such as oxygen or hydrogen peroxide which oxidizes the uranium to the hexavalent state at which it forms water soluble uranyl complexes such as uranyl carbonate or uranyl sulfate ions.

The pregnant lixiviant produced during the leaching operation is then processed in order to recover the uranium therefrom. Various procedures may be employed. In one technique, a concentrated uranium solution is produced by passing the pregnant lixiviant over an anionic ion exchange resin and then eluting the resin with an eluant in order to desorb the uranium. The eluting procedure produces a relatively concentrated uranium solution, termed the "eluate", from the ion exchange column. Another technique for concentrating the uranium from the pregnant lixiviant involves solvent extraction. In this case the lixiviant is extracted with a suitable solvent and the solvent then subjected to a stripping action in order to recover the uranium in the relatively rich eluate. Regardless of the concentration procedure used, the eluate is then treated to precipitate uranium to produce the familiar "yellowcake". Various precipitation techniques are described in Merritt, R. C., THE EXTRACTIVE METALLURGY OF URANIUM, Colorado School of Mines Research Institute, (1971), in Chapter 7, "Precipitation and Product Preparation". One suitable technique disclosed in Merritt at pages 247 and 248, involves precipitation with hydrogen peroxide. In this case, the pH of the eluant is adjusted as necessary to an acidic level, e.g. a pH of less than 4, and treated with a stoichiometric excess of hydrogen peroxide. The resulting uranium peroxide precipitates from the eluant to form yellowcake. The uranium product in the yellowcake may be characterized by the formula $UO_4.XH_2O$, wherein the value of X normally will range from 2 to 4.

Subsequent to the precipitation step, the resulting yellowcake slurry is separated from the decant and then subjected to additional dewatering steps such as centrifuging or vacuum filtration as described in Meritt at pages 248–251. The yellowcake may then be dried and calcined at an elevated temperature in order to form the uranium oxide final product as described in pages 252–254 of Merritt.

SUMMARY OF THE INVENTION

In accordance with the present invention there is provided a new and improved process for the processing of uranium yellowcake which is produced by precipitation with hydrogen peroxide and which contains sodium chloride as an impurity. In carrying out the invention, the yellowcake is calcined at an elevated temperature in order to effect decomposition of the yellowcake to uranium oxide. In the course of the calcination step, the decomposition of the yellowcake is accompanied by the evolution of free oxygen. In accordance with the present invention, the calcination procedure is carried out in the presence of a reducing agent which reacts with the free oxygen to retard the evolution of chlorine gas.

In a further embodiment of the invention, the calcination procedure is carried out at a temperature of at least 750° C. to produce a sodium chloride aerosol. The sodium chloride aerosol is then removed from the uranium in order to reduce sodium and chloride contamination of the final product.

DESCRIPTION OF THE SPECIFIC EMBODIMENTS

In the course of recovering uranium by hydrogen peroxide precipitation, the yellowcake often contains sodium chloride as an impurity. The sodium chloride may originate from a number of sources. For example, in leaching operations employing a carbonate lixiviant with subsequent concentration by anionic ion exchange resins, the ion exchange columns may be eluted with an eluant containing sodium chloride in addition to carbonate and bicarbonate ions. In addition, the hydrogen peroxide precipitation procedure typically involves preacidification with hydrochloric acid. After the addition of the hydrogen peroxide, sodium hydroxide is then added to increase the pH of the solution and ensure complete precipitation. Sodium chloride is of course produced as a product of neutralization of the hydrochloric acid by the sodium hydroxide.

Regardless of the source of the sodium chloride impurity in the yellowcake, the calcination procedure often is accompanied by the evolution of chlorine gas. In this regard, the thermal decomposition of uranium peroxide yellowcake to uranium oxide is attended by dehydration, deoxygenation, and, where sodium chloride is present as an impurity, chlorine evolution, at temperatures ranging from about 100° to about 900° C. As the calcination process is begun, dehydration due to removal of the water of crystallization occurs at temperatures within the range of about 100° to 300° C. to produce uranium tetraoxide as an intermediate product. At temperatures within the range of about 200° to 500° C., uranium tetraoxide is converted to uranium trioxide with the evolution of free oxygen. Also at temperatures of about 300° to 500° C., chlorine gas evolution occurs by oxidation of the chloride ion to molecular chlorine. At temperatures ranging from about 700° to about 900° C., the uranium trioxide is converted to triuraniumoctoxide with the evolution of additional oxygen.

The evolution of chlorine gas during calcination of the yellowcake is advantageous in that it reduces the chloride contamination of the final product. However, the chlorine gas evolved is corrosive to the equipment employed in the processing procedure and if released to the atmosphere, it is also harmful to the environment. Chlorine evolution at intermediate temperatures, e.g. on the order of 300° C., occurs readily where the yellowcake is wet. In a typical yellowcake processing plant, the product effluent produced by a clarification step and several centrifuging stages, may consist of equal parts of water and solids when passed to the drying and calcination stage. Thus the problems presented by chlorine gas evolution during the drying and calcination stage may be quite severe.

In accordance with the present invention there is provided a process to retard the evolution of chlorine gas due to chloride oxidation. This is accomplished by carrying out the calcination procedure in the presence of a reducing agent which reacts with the free oxygen produced during thermal decomposition of the yellowcake. The invention may be practiced employing any suitable reducing agent which is preferentially oxidized by the evolved oxygen in the presence of the chloride. Preferred reducing agents for use in carrying out the invention exist in the gaseous state at the temperature of the calcination procedure. Ammonia is especially suitable since it is readily oxidized by the oxygen to produce nitrogen and water (steam), which can be continuously removed from the calcination reactor. Thus a suitable agent such as ammonium carbonate, ammonium bicarbonate, or urea, which volatilizes at the temperatures involved to produce gaseous ammonia, may be added to the yellowcake slurry. Other suitable compounds which may be employed as reducing agents in carrying out the invention include ammonium sulfate, ammonium sulfite, ammonium sulfide, ammonium bisulfite, ammonium hydroxide, hydrogen sulfide, and anhydrous ammonia. The reducing agent preferably is present in an amount at least stoichiometrically equivalent to the free oxygen evolved during the calcination step. When the reducing agent is selected from the group consisting of ammonium carbonate and ammonium bicarbonate and mixtures thereof, it preferably is present in an amount of at least 15 weight percent of the uranium present in the yellowcake.

In experimental work carried out relative to the invention, a number of experiments were carried out employing ammonia derived from ammonium carbonate, ammonium bicarbonate, and urea in simulated calcination steps carried out at about 300° C. The experiments were carried out in a quartz reaction tube. Air was passed into the tube at one end and the effluent from the other end was passed directly into a bottle containing a 0.1 normal solution of potassium iodide. Color changes in the potassium iodide were observed and liberated iodine was titrated with a standard thiosulfate solution to provide a quantitative indication of the evolution of chlorine gas during the simulated calcination step. The yellowcake employed in the experimental work was uranium peroxide yellowcake obtained by a hydrogen peroxide precipitation process. The yellowcake was contaminated with sodium chloride and in the absence of ameliorative steps approximately 1 liter of chlorine gas was evolved from a pound of yellowcake when it was heated at a temperature of about 300° C.

In the first series of experiments several tests were carried out using ammonia derived from ammonium carbonate and ammonium bicarbonate. The ammonia was found to be effective in retarding chloride oxidation to chlorine so long as the oxygen evolved from the uranyl peroxide was not stiochiometrically greater than the ammonia supply. When the uranyl peroxide and ammonium carbonate were mixed together and heated, a rapid reaction between the two occurred and the ammonia was rapidly lost. When the ammonium carbonate and the yellowcake were placed in separate sample boats within the reaction tube, a constant supply of ammonia gas was evolved throughout the uranyl peroxide decomposition procedure and only a very small amount of chlorine evolution was observed.

Another experiment at about 300° C. was carried out employing urea which was added to the yellowcake to provide a source of ammonia. The urea decomposed smoothly and the ammonia thus produced was effective in reducing the production of chlorine gas to the point where it was practically nil.

In a further embodiment of the invention, the calcination step is carried out, again in the presence of a reducing agent, at a temperature of about 750° C. or more in order to produce a sodium chloride aerosol. By this technique, the production of chlorine gas is retarded as described previously. In addition, the sodium chloride aerosol is removed from the calcination chamber, thus reducing sodium and chloride contamination of the final product.

In further experimental work relative to the invention, tests were carried out simulating the calcination of the previously described yellowcake at a temperature of about 760° C. In one such embodiment 0.4295 gram of dry yellowcake was mixed with 1 milliliter of a 20% solution of ammonium carbonate and the resulting mixture placed in a porcelain sample boat and heated in the reaction chamber at about 760° C. While a color change in the potassium iodide solution indicated some initial chlorine evolution, throughout most of the test the evolved ammonia was effective in reducing the chlorine evolution. Similar experimental work was carried out employing ammonium bicarbonate, and it was found that so long as the ammonium compound was present, oxidation of the chloride was effectively prevented. It was only after all of the ammonia was consumed or swept out of the sample tube that some oxidation of the chloride ion occurred. An additional test was carried out employing ammonium chloride, but it was found to produce a volatile uranium mixture which was swept from the reaction chamber into the bottle containing the potassium iodide solution.

The reducing agent may be added in the calcination step by any suitable procedure. For example, a gaseous reducing agent such as ammonia or hydrogen sulfide may be injected into a suitable closed chamber during the calcination step. Alternatively, volatile solids such as ammonium carbonate or ammonium bicarbonate as described previously may be mixed directly with the yellowcake in either the slurry or powder form.

Ammonium carbonate or bicarbonate, or mixtures thereof, may also be employed in the aqueous solution used to elute an anionic ion exchange resin used for uranium concentration as described previously. Any suitable procedure may be employed in carrying out this embodiment of the invention. Thus, the present lixiviant is passed through one or more ion exchange columns operated in accordance with well-known techniques such as described in the aforementioned book by Meritt at page 167, et seq, under the heading "Ion Exchange Processes and Equipment". For example, the ion exchange column may be operated in a "fixed bed" mode or "moving bed" mode as described in Merritt. The anionic ion exchange resins employed for uranium concentration are characterized by fixed cationic adsorption sites in which the mobile anion, typically chloride, is exchanged by the uranyl complex anion. Such anionic ion exchange resins are disclosed, for example, in Merritt at pages 138–147 under the heading "Resin Characteristics". Suitable anionic ion exchange resins may take the form of polymers or copolymers of styrene substituted with quaternary ammonium groups or polymers or copolymers of pyridine which are quaternized to form pyridinium groups.

When the ion exchange resin becomes loaded with uranium, the ion exchange column is then switched to an elution cycle in which an aqueous eluant is passed through the ion exchange column to desorb uranium from the resin. In elution procedures for an ion exchange resin employed to adsorb uranium values from a carbonate lixiviant, a typical eluant may contain carbonate and/or bicarbonate ions either alone or in combination with other anions such as chloride ions. In the present invention, ammonium carbonate and/or ammonium bicarbonate are employed in the eluant to provide bicarbonate and/or carbonate ions in solution to ion-exchange with the uranyl anions, and in addition, to provide for an excess of ammonium ions which ultimately will provide ammonia as a reducing agent during the subsequent calcination step. The use of ammonium carbonate and/or bicarbonate in the elution of ion exchange resins is of course in itself old and well-known in the art as evidenced, for example, by U.S. Pat. No. 2,811,412 to Poirier and U.S. Pat. No. 4,092,399 to Narayan et al. Elution procedures such as those disclosed in the patents to Poirier and Narayan may be used provided that ammonium carbonate and/or bicarbonate is retained in the rich eluate. The eluate is then contacted with hydrogen peroxide in accordance with a suitable procedure as described above to precipitate the uranium as the peroxide yellowcake. The acidic environment in which the hydrogen peroxide precipitation procedure is typically carried out will result in the evolution of carbon dioxide. However, the ammonium ions are stable at the low pH levels and will remain in solution, e.g., in the form of ammonium chloride where hydrochloric acid is employed in the acidification step. During the calcination procedure, gaseous ammonia evolved from the ammonium compound reacts with the free oxygen resulting from the uranium peroxide decomposition as described previously.

I claim:

1. In a method for the recovery of uranium wherein uranium yellowcake produced by precipitation with hydrogen peroxide and containing sodium cloride as an impurity is calcined at an elevated temperature to effect decomposition of the yellowcake to uranium oxide with the evolution of free oxygen, the improvement comprising carrying out said calcination procedure in the presence of a reducing agent which reacts with said free oxygen to retard the evolution of chlorine gas.

2. The method of claim 1 wherein said calcination procedure is carried out at a temperature of at least 300° C.

3. The method of claim 1 wherein said calcination procedure is carried out at a temperature of at least 750° C.

4. The method of claim 1 wherein said reducing agent is present in an amount at least stoichiometrically equivalent to the free oxygen evolved during said calcination step.

5. The method of claim 1 wherein said reducing agent is a compound which produces gaseous ammonia at the temperature at which said calcination procedure is carried out.

6. The method of claim 5 wherein said compound is selected from the group consisting of ammonium carbonate and ammonium bicarbonate and mixtures thereof.

7. The method of claim 6 wherein said ammonium compound is present in an amount of at least 15 weight percent of the uranium present in said yellowcake.

8. In a method for the recovery of uranium from an anionic ion exchange resin having uranium adsorbed thereon, the steps comprising:
   (a) eluting said resin with an aqueous eluant containing ammonium carbonate and/or ammonium bicarbonate to form a rich eluate containing uranium and ammonium carbonate and/or ammonium bicarbonate,
   (b) contacting said rich eluate with hydrogen peroxide to precipitate uranium peroxide to form yellowcake, and,
   (c) calcining said yellowcake in the presence of ammonium ions resulting from said ammonium carbonate and/or bicarbonate at an elevated temperature sufficient to effect decomposition of said yellowcake to uranium oxide with the evolution of free oxygen wherein gaseous ammonia is evolved and reacted with said free oxygen.

* * * * *